United States Patent [19]
Flory et al.

[11] Patent Number: 5,263,399
[45] Date of Patent: Nov. 23, 1993

[54] FLUID BOOSTER WITH DUAL MEMBER INPUT VALVE

[75] Inventors: Donald M. Flory, Arcanum; Edward J. De Hoff, Huber Heights, both of Ohio

[73] Assignee: General Motors Corporation, Detroit, Mich.

[21] Appl. No.: 895,064

[22] Filed: Jun. 8, 1992

[51] Int. Cl.$^5$ .............................................. F15B 9/10
[52] U.S. Cl. ................................ 91/376 R; 60/547.1; 92/48; 92/96
[58] Field of Search ............... 91/369.1, 369.2, 373, 91/376 R, 375 R, 533; 60/547.1; 92/48, 49, 96, 98 D, 99, 101

[56] References Cited

U.S. PATENT DOCUMENTS

| | | | |
|---|---|---|---|
| 4,738,186 | 4/1988 | Rossigno et al. | 92/99 X |
| 4,800,799 | 1/1989 | Nishii | 91/376 R X |
| 4,905,571 | 3/1990 | Dehoff et al. | 91/376 R X |
| 4,970,940 | 11/1990 | Boehm et al. | 91/376 R X |
| 5,031,404 | 7/1991 | Flory et al. | 91/376 R X |
| 5,076,142 | 12/1991 | Steer et al. | 92/99 X |
| 5,086,690 | 2/1992 | Flory et al. | 91/376 R X |
| 5,167,180 | 12/1992 | Verbo et al. | 91/376 R X |

FOREIGN PATENT DOCUMENTS

| | | | |
|---|---|---|---|
| 970000 | 6/1975 | Canada | 91/376 R |
| 2024967 | 1/1980 | United Kingdom | 91/376 R |

*Primary Examiner*—Edward K. Look
*Assistant Examiner*—Hoang Nguyen
*Attorney, Agent, or Firm*—Ernest E. Helms

[57] ABSTRACT

A valving arrangement as provided for a vehicle brake booster wherein an inlet valve has two ring members. The inlet valve, by providing the two ring members, one ring member inserted within another member, is less vulnerable to leaks due to a lack of parallelism.

10 Claims, 4 Drawing Sheets

FLUID BOOSTER WITH DUAL MEMBER INPUT VALVE

FIELD OF THE INVENTION

The field of this invention is that of a valving arrangement for a fluid booster. The present invention is especially useful in pneumatic powered boosters for vehicle hydraulic braking systems.

DISCLOSURE STATEMENT

The present invention includes alternative embodiments to the invention disclosed in DeHoff et al U.S. Pat. No. 4,905,571 and Flory et al U.S. Pat. No. 5,031,404, the disclosures of which are incorporated by reference herein.

In both the DeHoff et al and Flory et al brake boosters, the boosters include a housing having first and second ends with first and second annular flexible diaphragms spaced from one another forming a sealed second chamber within the housing and a sealed first chamber between the first diaphragm and the first end of the housing. A generally annular shaped power piston is sealably joined with the diaphragms. Slidably mounted within the power piston is an inlet valve. The inlet valve has one valving surface for making contact with a valve seat formed by a portion of the power piston. The inlet valve also has a valving surface or seat which makes contact with the control valve which is operatively associated with the brake pedal. In cooperation with the control valve, the inlet valve controls fluid flow from the pressurized fluid source to the modulated first chamber and from the modulated first chamber to an exhaust chamber. In the poise position, the inlet valve restrains fluid communication from the pressurized fluid source to the modulated first chamber and also restrains any fluid communication between the modulated first chamber and the exhaust chamber.

In achieving the poised position, it is important that the inlet valve have a great degree of parallelism in its movement (with respect to a travel axis of the power piston) to prevent any leakage of fluids. It has been found that when higher inlet pressures are involved, the parallelism requirement of the inlet valve to achieve proper valve functioning can be burdensome. Therefore, there exists a need to provide an inlet valve which can properly perform in the poised position which is more indulgent in its dimensional tolerances.

SUMMARY OF THE INVENTION

The present invention provides a two-piece inlet valve which brings forth that which those who are familiar with the art have yearned for, an inlet valve which possesses excellent functionality while enjoying freedom from excessive dimensional requirements of parallelism in its manufacturing.

Further objects and advantages of the present invention can become more apparent to those skilled in the art as the nature of the invention is better understood from the accompanying drawings and a detailed description.

DETAILED DESCRIPTION OF THE INVENTION

Figure 1:
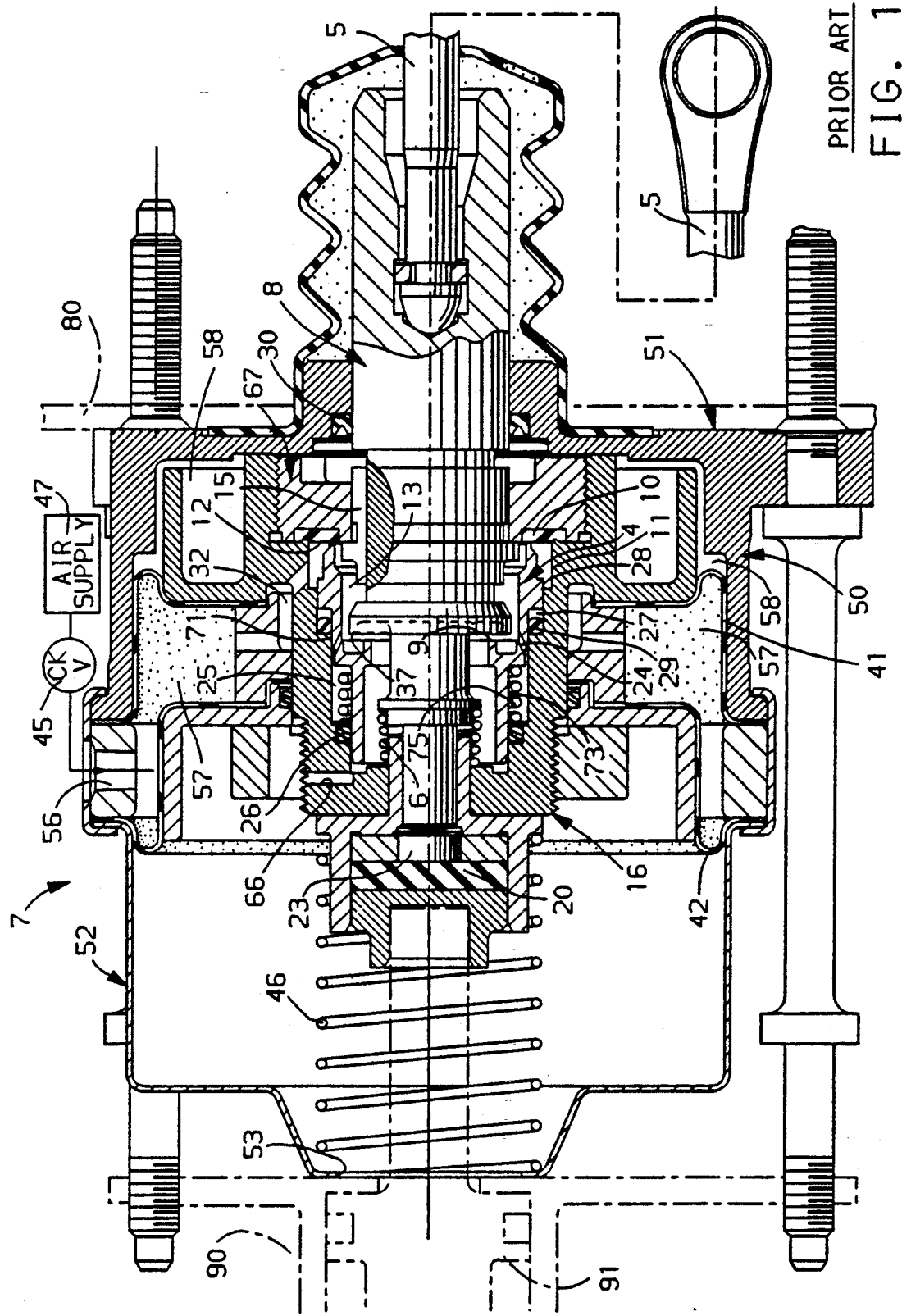
FIGS. 1 and 2 are a side elevational view of a preferred embodiment brake booster according to DeHoff et al and Flory et al, respectively.
Figure 2:
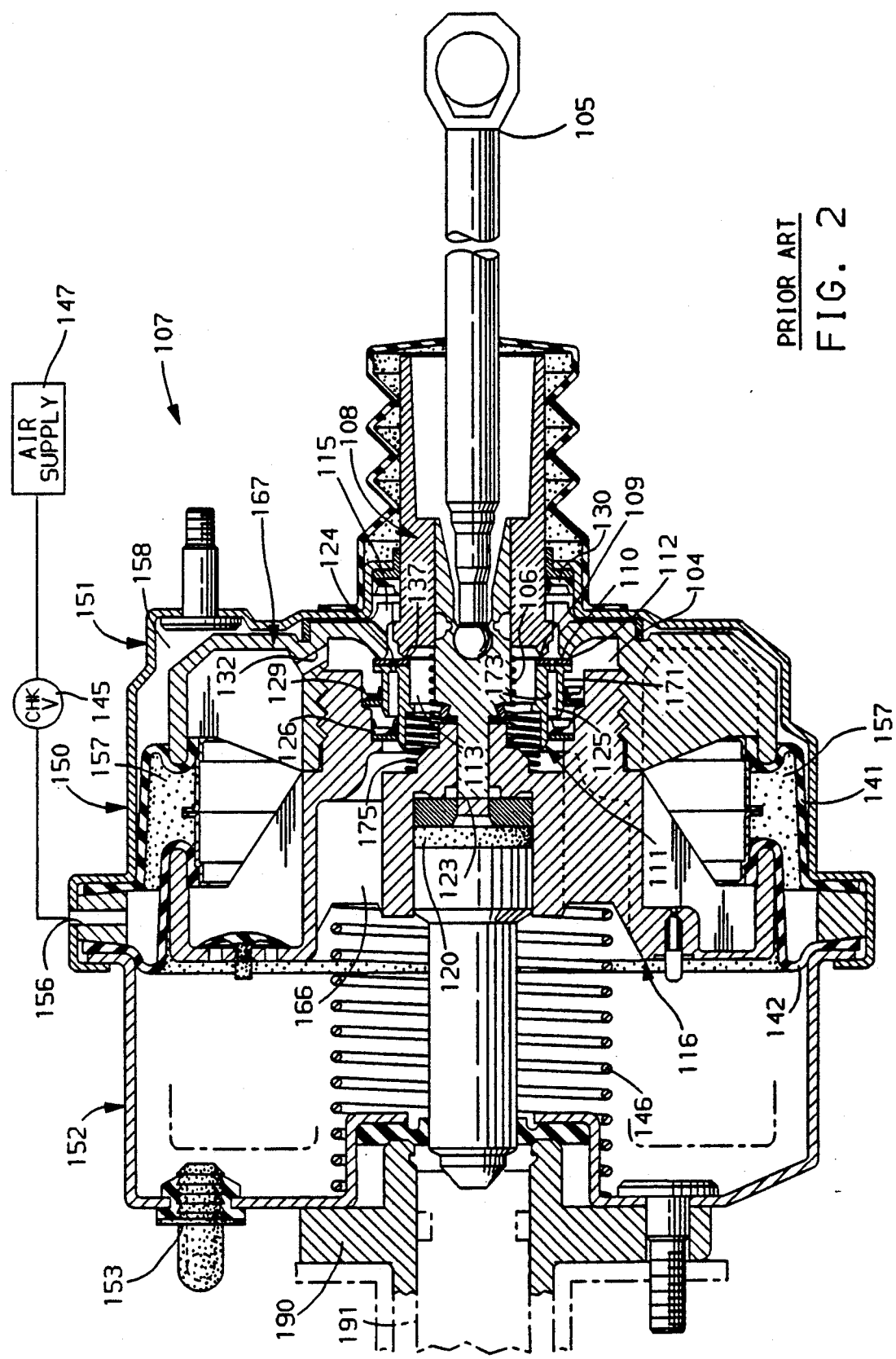

Referring to FIGS. 1 and 2, pneumatic brake booster system 7, 107 is a servomechanism designed to multiply the manual pedal force provided by a driver of a vehicle 80 to operate a vehicle brake system via a master cylinder piston 91, 191. The boosters 7, 107 is connected between a brake pedal linkage 5, 105 and the piston 91, 191 of a master cylinder 90, 190. Pressurized air is the energy transfer medium described below; however, other mediums (for example, hydraulic fluid) may be used with minor modifications.

The booster 7, 107 is shown in the normal position prior to brake application. The booster 7, 107 has a housing 50, 150. The housing 50, 150 has a first end 51, 151 and a second end 52, 152. First end 51, 151 is generally sealed, and second end 52, 152 is open to the atmosphere or a vacuum source through a vent 53, 153. First end 51, 151 also has an inlet 56, 156.

Within the housing 50, 150 are two annular flexible diaphragms 41, 42, 141, 142 which are spaced from one another, forming a sealed air storage control volume hereinafter referred to as the second chamber 57, 157 or air reservoir. The second chamber 57, 157 is in fluid communication with the fluid inlet 56, 156. Between the first flexible diaphragm 41, 141 and the housing first end 51, 151 is a sealed control volume hereinafter referred to as the first chamber 58, 158. Sealingly connected with the first 41, 141 and second 42, 142 diaphragms along its exterior is an annular shaped power piston 16, 116. The power piston 16, 116 mounts first and second diaphragms 41, 141 and 42, 142, respectively. The pistons 16, 116 has a first fluid passage 32, 132 connecting the second chamber 57, 157 with the interior of pistons. The piston 16, 116 is biased in a first direction away from the master cylinder by a spring 46, 146.

The piston 16, 116 has a second fluid passage 66, 166 from its interior to an area of the housing second end 52, 152. A chamber valve seat 67, 167 separating the first 58, 158 and second 57, 157 fluid chambers is connected with the piston 16, 116.

Slidably mounted within piston 16, 116 is an inlet valve 11, 111. The inlet valve 11, 111 is biased by a spring 75, 175. The inlet valve 11, 111 has a modulated fluid passage 24, 124 between its interior and exterior. The inlet valve 11, 111 also at a first larger diameter has a valving surface 10, 110 for contact with a valve seat 12, 112 to prevent fluid communication between the piston first passage 32, 132 and the first chamber 58, 158. The inlet valve 11, 111 also has an exterior first sliding surface 71, 171 at the first diameter sealed by an 0-ring 29/lip seal 129.

At a second diameter, differing from the first diameter (smaller), the inlet valve 11, 111 has a second exterior sealing surface 73, 173 and is sealed by O-ring 26/lip seal 126. At the second diameter, the inlet valve 11, Ill has an exhaust valve seat 9, 109.

A control valve 8, 108 is connected with the master cylinder piston 91, 191 and the brake linkage 5, 105. The control valve 8, 108 is biased by a spring 6, 106 away from the piston 16, 116. The control valve 8, 108 is slidably and sealably connected in the first end 51, 151 of the housing and is sealed by a lip (or other type seal) seal 30, 130 at the second diameter.

At the second diameter, the control valve 8, 108 has a valving surface 37, 137 for mating with the valve seat 9, 109 at the second diameter. Movement of the control valve 8, 108 by the brake pedal (via push rod 5, 105) causes the control valve valving surface 37, 137 to contact the valve seat 9, 109 to seal off the interior of the inlet valve 11, 111 from the vent 53, 153.

Pressurized air from a supply source 47, 147 passes through a check valve 45, 145. The air then passes into the second chamber 57, 157. Passage 32, 132 forms a power piston first fluid passage to admit supply pressurized air to the annulus 4, 104. All other areas of the booster 7, 107 are at a lower or atmospheric pressure. When force is applied at the push rod 5, 105 part of the brake linkage, sufficient to overcome spring 6, 106, the valving surface 37, 137 of the control valve 8, 108 is moved into contact with the valve seat 9, 109, closing the annulus 13, 113 from the lower pressure or atmosphere. Further motion (of control valve 8, 108) moves the valving surface 10, 110 of the inlet valve 11, 111 away from contact with the valve seat 12, 112, admitting the supply pressure from second chamber 57, 157 to the annulus 13, 113. From the annulus 13, 113, modulated pressure is admitted to first chamber 58, 158 through passage 15, 115. The imbalance of pressure behind power piston 16, 116 causes a force in the direction of the push rod 5, 105 (towards the master cylinder 90, 190). The rolling diaphragms 41, 141 and 42, 142 allow the piston 16, 116 to move in the direction of the push rod force and to push against primary piston 91, 191 of the conventional hydraulic master cylinder 90, 190 to apply the brakes of the vehicle.

Since the reaction disc 20, 120 is a relatively soft elastomer, the force applied to it tends to displace a portion of its volume through the slidable reaction piston 23, 123 to the end of the control valve 8, 108 and hence through the push rod 5, 105 and on to the brake pedal where a force proportional to the area of the reaction disc 20, 120 and the reaction piston 23, 123 and the lever ratio of the pedal is transmitted to the foot of the driver. The above-noted mechanism, by providing a force directly proportional to that applied to the master cylinder piston 91, 191, provides the driver with the "feel" necessary to a controlled vehicle stop. Using this feedback mechanism, the driver is able to meter the supply pressure from second chamber 57, 157 to first chamber 58, 158 and is in full control of the modulated pressure in second chamber 58, 158.

During brake supply, the modulated or variable pressure also exits in the annulus 13, 113. Passage 24, 124 admits modulated air into an annulus 25, 125. Since the diameter at the inside of seal 26, 126 is equal to that of the valving surface 37, 137 of the control valve 8, 108, and the pressure on both areas is modulated pressure, it follows that the inlet valve 11, 111 is balanced for any value of modulated pressure. Modulated air in annulus 13, 113 is admitted to first chamber 58, 158 through passage 15, 115. Since the diameter at the inside of seal 30, 130 is equal to that of the valving surface 37, 137 of the control valve 8, 108 and the pressure on both areas is modulated pressure, it follows that the control valve 8, 108 is balanced for any value of modulated pressure. The above, together with the balancing of the inlet valve 11, 111 (described later), provides for a controlled force between valving surface 37, 137 of the control valve 8, 108 and the face of the valve seat 9, 109 which is unaffected by modulated pressure.

Supply air in an annulus 4, 104 is admitted to an annulus 27 through the clearance 28 between the inlet valve 11 and the power piston 16. Since the diameter at the inside of seal 29, 129 is equal to that of the valving surface 10, 110 of the inlet valve 11, 111 and the pressure on both areas is supply pressure, the inlet valve 11, 111 is balanced for any value of supply pressure. The above provides for a controlled force between valving surface 10, 110 of the inlet valve 11, 111, and the valve seat 12, 112, which is unaffected by supply pressure.

Without the various balancing arrangements described above, the device would tend to self-apply, self-release, or create variable forces for different pressure values dependent on the magnitude and/or direction of the area imbalance.

When the force on the brake pedal is reduced, the reaction forces urge the control valve 8, 108 in a direction to allow the valving surface 10, 110 of the inlet valve 11, 111 to again contact the inlet valve seat 12, 112, sealing the annulus 13, 113 from supply pressure and maintaining the brake apply force as is. The above is known as the "poise" position. Further reduction of pedal force moves the valving surface 37, 137 of the control valve 8, 108 away from the valve seat 9, 109 and opens annulus 13, 113 to atmospheric or a lowered pressure. If the valving surface 37, 137 remains out of contact with valve seat 9, all modulated pressure will be lost and the vehicle brakes will be released.

Figure 3:
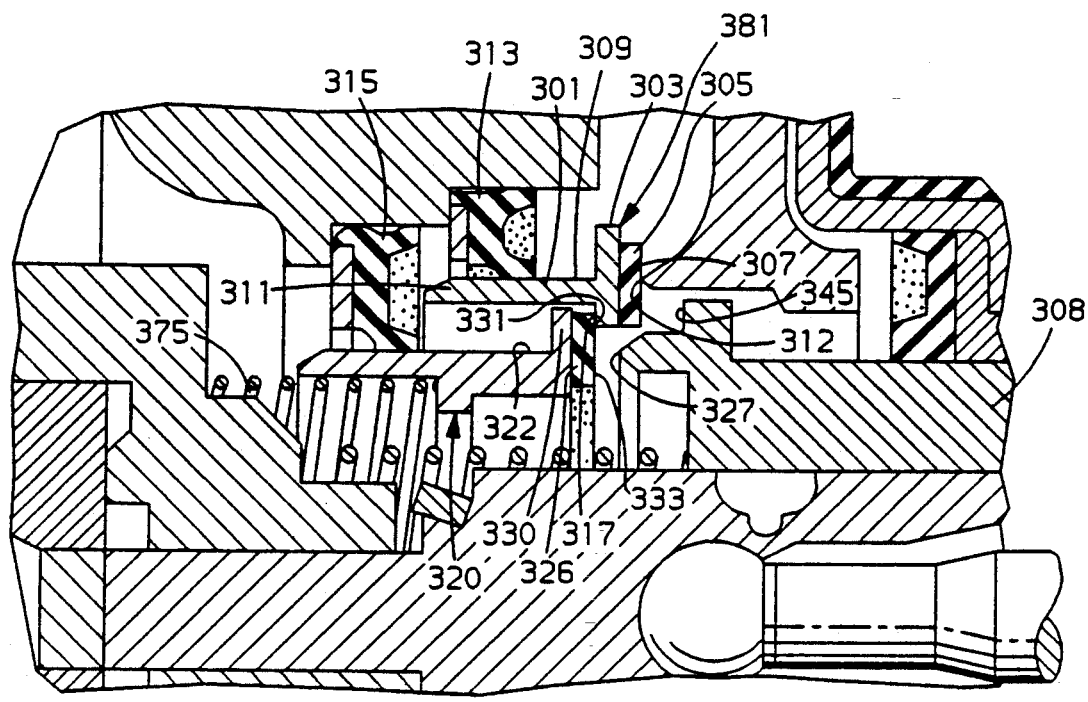
FIG. 3 is an enlarged view of a portion of a brake booster according to Flory et al with a preferred embodiment inlet valve according to the present invention incorporated therein.

Referring to FIG. 3, the inlet valve 381 of the present invention has a first ring member 301 and inserted therein a second ring member 320. The inlet valve first ring member 301 has a cylindrical body 311 capped by a sealing head 303. The head 303 has on an end facing towards the housing first end a polymeric ring 305 (typically elastomeric) providing an alpha sealing surface 307. The alpha sealing surface in operation seals with the chamber valve seat 312. On the side of the head 303 oriented towards the housing second end 152, the head 303 has a beta sealing surface 317. The beta sealing surface in operation to be described later seals with the second ring member 320. The inlet valve first ring member 301 has a sliding surface 309 sealed by a lipseal 313 and the sliding surface 309 is at the same diameter that the first ring member alpha sealing surface 307 makes contact with the chamber valve seat 312.

Slidably inserted within the first inlet valve member 301 is a second inlet valve ring member 320 which is biased by a spring 375 towards the housing first end 151. The second inlet valve ring member 320 has a sealing head 330 with an elastomeric ring 326 having a primary valving surface 331 for sealably contacting the valving surface 317 of the first member and a secondary valving surface 333 for selective contact with the valve seat 327 of the control valve 308. In the position shown, the inlet valve second ring member 320 is making sealing contact with the beta valving surface 317 of the first member; however, there exists a slight clearance between the head 330 of the second inlet valve member and the cylindrical body portion 311 of the first inlet valve member 301.

Figure 4:
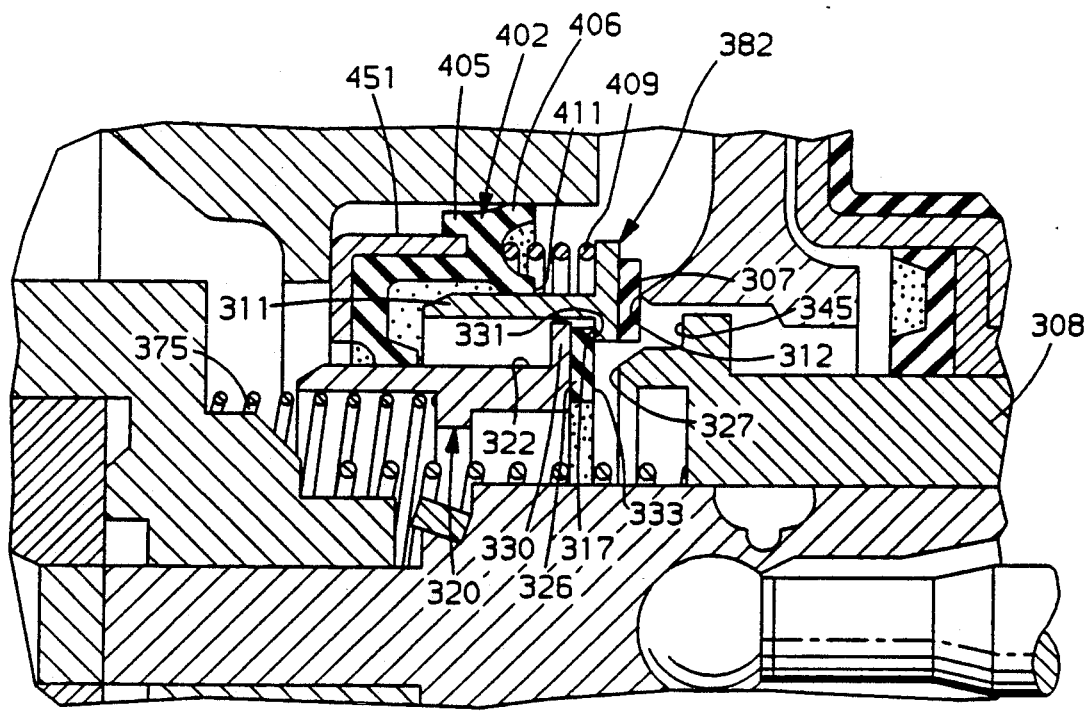
FIG. 4 is an alternative preferred embodiment to the embodiment shown in FIG. 3.

In operation, the control valve 308 (fabricated from two pieces 335, 338 which are adhesively joined) is moved leftwardly from the position illustrated to operate the brake booster. The sealing surface 327 on the control valve 308 will first contact the second inlet valve member 320 sealing with the primary sealing surface 333 of the second inlet valve member 320 and therefore allowing the pressure to the left of the inlet valve second ring member head 330 and to the left of the lipseal 313 (which seals the first sliding surface 309) to be equal to whatever pressure is within the first pressure chamber 158, which corresponds to the modulated pressure of the brake booster. Further leftward movement of the control valve 308 causes a contact head 345 of the control valve to nonsealably engage the elastomeric ring 305 of the first valve ring member to urge it leftwardly, thereby allowing the pressurized air to enter into the modulated pressure chamber 158. As the power piston 116 moves leftwardly, the booster will come to a poised position wherein the first inlet valve member alpha valving surface 307 will again re-engage with the chamber valve seat 312 while at the same time the control valve valving surface 327 will still be engaged with the secondary valving surface 333 of the second inlet valve ring member (which corresponds to the diameter of the second valving members sealed siding surface 322). In the poised position, the area to the left of the second valve member head 330 will be at the same pressure as modulated pressure, and parallelism between the sealed sliding surfaces 309, 322 will no longer be as critical since they will be compensated by the lipseals 313, 315 and the elastomeric sealing surfaces 307, 333 on the first and second valve members. is Referring to FIG. 4 (elements of like function given the same reference numerals as shown in FIG. 3), the present invention has shown an alternative embodiment 382 having a tri-lipseal 402 which is held in position by an L-bracket angular brace 451 which forms a cup which holds the first two lips 406, 411 of the seal. Additionally, the first inlet valve member 301 has an independent biasing spring 409. The operation of the arrangement of that as shown for FIG. 4 will be substantially identical to that as previously described for FIG. 3.

Figure 5:
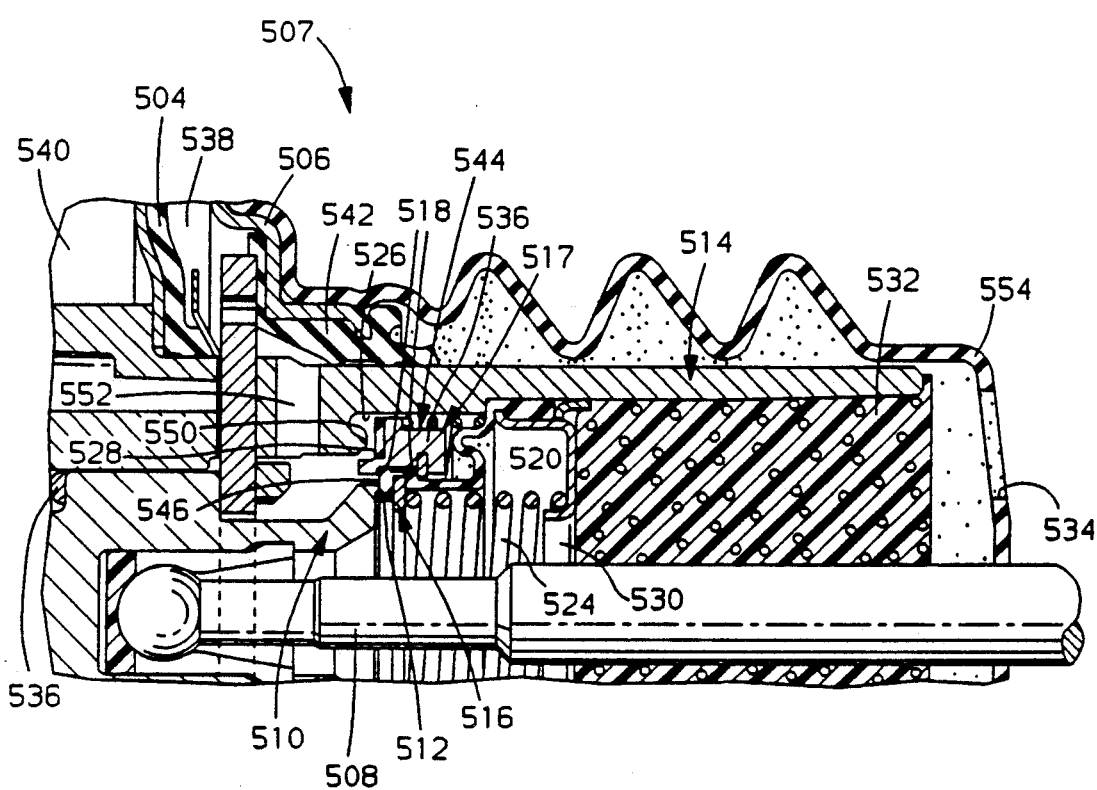
FIG. 5 is a sectional view of the present invention utilized with a vacuum-actuated pneumatic brake booster.

Referring to FIG. 5, the present invention has shown utilized in a pneumatic vehicle booster 507 similar to that shown and described in U.S. Pat. No. 5,086,690 to Flory et al, the disclosure of which is incorporated by reference herein. The booster 507 has a housing 506 which, via a bearing-sealing member 542, slidably mounts a power piston 514. The power piston 514 has joined thereto a diaphragm 504 which provides a pressure boundary between a variable or modulated control volume 538 and a vacuum control volume 540. A longitudinal passage on the lower end of the power piston (not shown) connects with area 526 to expose area 526 to the vacuum control volume 540.

Mounted by a retainer 530 is a first valve member 544. The first valve member 544 has an inner first ring member sealing head 516 which is positionally biased by a spring 524. The first valve inner member 544 has an alpha sealing surface 546 and beta valving surfaces along the top outer radial ends of two elastomeric ridges 518 and also along the rearward (or rightward) as shown in the drawing end of the second ridge 518.

The first valve member 544 also has a second outer member 517 which has a sealing head 536 with a sealing surface 528. The sealing surface 528 mates with a seat 550 formed on the power piston 514, which then separates the area 526 exposed to the vacuum control volume from the modulated control volume 538. The area 526, by series of passages 552, is connected with the interior of the power piston 514.

Cooperating with the first valve member 544 is a second valve member 510. The second valve member 510 is biased by a spring 536 towards the first valve member 544 and is activated by a push rod 508 which is operatively associated with a brake pedal (not shown). In the non-actuated position, the valving surface 528 is mated with the seat 550. Therefore, the modulated control volume 538 is not exposed to the vacuum control volume 540. Additionally, the alpha valving surface 546 is mated with a seat formed upon a tip 512 of the second valve member 510. The above-noted mating prevents air from entering through an inlet orifice 534 of a dust shield 554 through a filter 532 to the control volume 538.

As is well known to those experienced in the art, the orifice 534 will be at atmospheric pressure. To actuate the booster 507, the push rod 508 will move leftward, causing the valving surface 528 to mate with the seat 550 and thereafter upon further leftward movement will cause the tip 512 to disengage from the valving surface 546 allowing air at atmospheric pressure to enter the modulated control volume 538, therefore pushing the power piston 514 leftward to actuate a master cylinder (not shown). In a poised position, the sealing surface 528 will be mated with the seat 550 while at the same time the sealing surface 546 will be mated with the tip 512 and the modulated pressure will be pressure immediate the vacuum and the atmospheric pressures.

While embodiments of the present invention have been explained, it will be readily apparent to those skilled in the art of the various modifications which can be made to the present invention without departing from the spirit and scope of this invention as it is encompassed by the following claims.

The embodiments of the invention in which an exclusive property or privilege is claimed are defined as follows:

1. An improved pressurized fluid vehicle brake booster for connection between a brake pedal linkage and a piston of a master cylinder, said booster in combination including:

a housing having means of connection with the vehicle and the master cylinder, the housing also having a fluid inlet and the housing having a first end being generally sealed and having a second end of the housing with a vent;

first and second annular flexible diaphragms spaced from one another forming a sealed second chamber within said housing and a sealed first chamber between the first diaphragm and the first end of the housing, the second chamber being in fluid communication with the housing fluid inlet;

a generally annular shaped power piston operatively associated with the master cylinder piston, the power piston being spring biased in a first direction and a power piston exterior being connected with both of the diaphragms, the power piston having a first fluid passage connecting the second chamber with a power piston interior and a second fluid passage from the interior of the power piston to an area in the second end of the housing;

a chamber valve seat separating the first and second chambers;

an annular inlet valve having a first outer ring member, the first ring member having a sealing head with an alpha valving surface facing towards said first housing end and a beta valving surface facing towards said second housing end, the first ring member alpha valving surface having contact with the chamber valve seat preventing fluid communication between said power piston first passage and the first chamber and the first ring member having an exterior sealed sliding surface at the same diameter of the first member alpha valving surface, and the inlet valve having a second ring member slidably inserted within the first ring member having a sealing head with primary and second valving surfaces towards the first housing end, the second ring member being biased towards the first housing end and the second ring member having an exterior sealed sliding surface at a second diameter differing from the diameter of the first member alpha valving surface, the second ring member primary valving surface being at the same diameter as the first ring member beta valving surface for engagement therewith; and a controlled valve, biased away from the power piston and connected with the pedal linkage and being slidably and sealably mounted within the first end of the housing at the second diameter, the control valve having a contact head for nonsealing contact with the sealing head of the first ring member, and the control valve having a valving surface at the second diameter for selectively sealably contacting the second ring member secondary valving surface, whereby movement of the control valve by the brake pedal causes the control valve valving surface to first contact the second inlet valve member secondary valving surface to seal off an interior of the inlet valve from the vent and to separate the inlet valve first ring member beta valving surface from the inlet valve second member primary valving surface and then further movement of the control valve against the biasing of the inlet valve secondary member causes the control valve contact head to contact the inlet valve first ring member sealing head to cause the first member alpha valving surface to be removed from the chamber valve seat allowing fluid from the second chamber to pass to the first chamber to urge the power piston toward the master cylinder piston and whereby, in the activated position, the inlet valve and the control valves are pressure balanced by said fluid.

2. A booster as described in claim 1 wherein the first inlet valve ring member has a polymeric portion on the head to form the first ring member alpha valving surface.

3. A booster as described in claim 1 wherein the second inlet valve member has an elastomeric portion on the head to form the primary and secondary valving surfaces.

4. A booster as described in claim 1 wherein one of the inlet valve ring members is sealed by a lipseal on its sliding surface.

5. A booster as described in claim 1 wherein the inlet valve first ring member is independently biased by a spring towards said housing first end.

6. A booster as described in claim 1 further comprising a one-piece, three-lobe lipseal for sealing the inlet valve with the power piston and the sealed sliding surfaces of said first and second inlet valve members.

7. A booster as described in claim 1 wherein there is an annular bracket having a generally L-shaped cross-section for supporting a three-lobe seal and wherein both of the inlet valve members are independently biased by separate springs and the three-lobe seal seals the sliding diameters of the first and second inlet valve ring members.

8. A valving arrangement for a servomechanism which includes a housing, a pressure boundary movable along a first axis within the housing, the pressure boundary having a body with an inlet for acceptance of a fluid at a higher pressure, and the body having a first passage to a sealed modulated pressure control volume and an outlet to a low pressure control volume, the pressure within the modulated control volume being intermediate the pressures within the high pressure inlet and low pressure control volume, the servomechanism also having a control valve axially movable along an axis parallel with the axis of travel of the pressure boundary body, the servomechanism further comprising a dual member inlet valve which, in cooperation with the control valve, governs the passage of fluid from the high pressure inlet into the modulated pressure control volume and between the modulated pressure control volume and the low pressure control volume, the inlet valve being slidably mounted and carried within the pressure boundary body, and in a poised position, the inlet valve in cooperation with the control valve cuts off fluid communication between the high pressure inlet and the modulated pressure control volume and between the modulated pressure control volume and the low pressure control volumes and the inlet valve having a first positionally biased ring member having a sealing head with an alpha valving surface facing towards a seat made within the valving body adjacent a first passage between the inlet and the modulated control volume, and the sealing head having a beta valving surface facing towards a generally opposite direction, the inlet valve first ring member alpha valving surface having contact with the body valve seat, preventing fluid communication between the inlet volume and the modulated pressure control volume, and the inlet valve first ring member having an exterior sealed sliding surface, and the inlet valve having a second positionally biased ring member slidably inserted within the first inlet valve ring member having a sealing head with primary and secondary valving surfaces facing in a direction towards the first ring member sealing head, the second inlet valve ring member being biased towards the first ring member sealing head and the second inlet valve member having an exterior sealed sliding surface; and wherein the control valve is biased away from the inlet valve and the control valve has a valving surface for selectively sealably contacting the second inlet valve member, whereby movement of the control valve causes the control valve valving surface to first contact the inlet valve second member secondary valving surface to seal off an interior of the inlet valve from the lower pressure control volume and to separate the first inlet valve ring member beta valving surface from the second inlet valve ring member primary valving surface and then further movement of the control valve against the biasing of the inlet valve second ring member causes a contact head of the control valve to contact the inlet valve first ring member sealing head to cause the first inlet valve ring member alpha valving surface to be removed from the body valve seat, allowing fluid from the inlet to pass to the modulated pressure control volume to urge the pressure boundary body in a given direction.

9. A valving arrangement for a servomechanism which includes a housing, a pressure boundary movable along a first axis within the housing, the pressure boundary having a body with an inlet for acceptance of a fluid at a higher pressure, and the body having a first passage to a sealed modulated pressure control volume and an outlet to a low pressure control volume, the pressure within the modulated control volume being intermediate the pressures within the high pressure inlet and low pressure control volume, the servomechanism also having a control valve axially movable along an axis parallel with the axis of travel of the pressure boundary body, the servomechanism further comprising a dual member inlet valve which, in cooperation with the control valve, governs the passage of fluid from the high pressure inlet into the modulated pressure control volume and between the modulated pressure control volume and the low pressure control volume, the inlet valve being slidably mounted and carried within the pressure boundary body, and in a poised position, the inlet valve in cooperation with the control valve cuts off fluid communication between the high pressure inlet and the modulated pressure control volume and between the modulated pressure control volume and the low pressure control volumes and the inlet valve having a first positionally biased ring member having a sealing head with an alpha valving surface facing towards a seat made within the valving body adjacent a first passage between the inlet and the modulated control volume, and the sealing head having a beta valving surface facing towards a generally opposite direction, the inlet valve first ring member alpha valving surface having contact with the body valve seat, preventing fluid communication between the inlet volume and the modulated pressure control volume, and the inlet valve first ring member having an exterior sealed sliding surface at the same diameter of the body valve seat, and the inlet valve having a second positionally biased ring member slidably inserted within the first inlet valve ring member having a sealing head with primary and secondary valving surfaces facing in a direction towards the first ring member sealing head, the second inlet valve ring member being biased towards the first ring member sealing head and the second inlet valve member having an exterior sealed sliding surface at a second diameter differing from the diameter of the body valve seat, the second ring member primary valving surface being at the same diameter as the first inlet valve member beta valving surface for engagement therewith; and wherein the control valve is biased away from the inlet valve and the control valve has a valving surface at the second diameter for selectively sealably contacting the second inlet valve member, whereby movement of the control valve causes the control valve valving surface to first contact the inlet valve second member secondary valving surface to seal off an interior of the inlet valve from the lower pressure control volume and to separate the first inlet valve ring member beta valving surface from the second inlet valve member primary valving surface and then further movement of the control valve against the spring biasing of the inlet valve second ring member causes a contact head of the control valve to contact the inlet valve first ring member sealing head to cause the first inlet valve ring member alpha valving surface to be removed from the body valve seat, allowing fluid from the inlet to pass to the modulated pressure control volume to urge the pressure boundary body in a given direction, and whereby in an activated poise position the inlet valve and the control valve are pressure balanced by the fluid.

10. A valving arrangement for a vacuum pneumatic vehicle brake booster includes a housing, a power piston forming a pressure boundary movable along a first axis within the housing, the power piston having an inlet for acceptance of a fluid at a higher pressure, and the power piston having a first passage to a sealed modulated pressure control volume and an outlet to a vacuum control volume, the pressure within the modulated control volume being intermediate the pressures within the inlet and vacuum pressure control volumes, the power piston also having a valve seat separating the vacuum control volume from the modulated control volume, the booster also having a dual member first valve axially movable along an axis parallel with the axis of travel of the power piston, the booster further comprising a second valve which, in cooperation with the first valve, governs the passage of fluid from the inlet into the modulated pressure control volume and between the modulated pressure control volume and the vacuum control volume, the first valve being slidably mounted and carried within the power piston, and in a poised position, the first valve in cooperation with the second valve cuts off fluid communication between the inlet and the modulated pressure control volume and between the modulated pressure control volume and the vacuum pressure control volumes and the first valve having an inner positionally biased first ring member having a first sealing head with an alpha valving surface facing towards a valve seat made with the second valve body, and the first sealing head having a beta valving surface, the first valve member alpha valving surface having contact with the valve seat formed by the second valve preventing fluid communication between the higher pressure control volume and the modulated pressure control volume when the booster is not actuated, and the first valve having a second outer ring member slidably surrounding the first valve first ring member having a head with a primary valving surface, the first valve second ring member being biased to engage with the power piston valve seat and the second ring member having a sliding sealing surface for engaging the first valve first ring member sealing head beta sealing surface; and wherein the second valve is biased toward the first valve, whereby movement of the second valve causes the first valve second ring member primary valving surface to first contact the power piston valve seat to seal off the modulated pressure control volume from the vacuum pressure control volume, and then further movement of the second valve against its bias causes the valve seat formed on the second valve to disengage from the first valve first ring member alpha sealing surface, allowing fluid communication between the inlet and the modulated pressure control volume to urge the pressure boundary body in an actuated direction.

* * * * *